United States Patent
Barnes et al.

(10) Patent No.: US 7,822,227 B2
(45) Date of Patent: Oct. 26, 2010

(54) METHOD AND SYSTEM FOR TRACKING IMAGES

(75) Inventors: Thomas H. Barnes, Austin, TX (US); John W. Dunsmoir, Round Rock, TX (US); Ram N. Ramanujam, Hoffman Estates, IL (US); Carol S. Walton, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1271 days.

(21) Appl. No.: 11/348,891

(22) Filed: Feb. 7, 2006

(65) Prior Publication Data

US 2007/0183763 A1    Aug. 9, 2007

(51) Int. Cl.
  *G06K 9/00* (2006.01)
(52) U.S. Cl. ..................................... 382/103
(58) Field of Classification Search .............. 382/103, 382/104; 348/169
  See application file for complete search history.

(56) References Cited

U.S. PATENT DOCUMENTS

| | | | | |
|---|---|---|---|---|
| 4,839,631 A * | 6/1989 | Tsuji | ........................... | 340/541 |
| 5,638,302 A * | 6/1997 | Gerber | ....................... | 702/158 |
| 6,553,296 B2 | 4/2003 | Breed et al. | | |
| 6,678,413 B1 | 1/2004 | Liang et al. | | |
| 6,972,787 B1 * | 12/2005 | Allen et al. | .................. | 348/162 |
| 7,119,674 B2 * | 10/2006 | Sefton | ......................... | 340/521 |
| 7,148,912 B2 * | 12/2006 | Han et al. | .................... | 348/143 |
| 7,149,325 B2 * | 12/2006 | Pavlidis et al. | .............. | 382/103 |
| 7,242,423 B2 * | 7/2007 | Lin | ............................. | 348/169 |
| 7,319,479 B1 * | 1/2008 | Crabtree et al. | ............. | 348/169 |
| 2001/0033330 A1 | 10/2001 | Garoutte | | |
| 2003/0053659 A1 * | 3/2003 | Pavlidis et al. | .............. | 382/103 |
| 2004/0061781 A1 * | 4/2004 | Fennell et al. | .............. | 348/169 |
| 2004/0233036 A1 | 11/2004 | Sefton | | |
| 2006/0015398 A1 * | 1/2006 | Weik | .......................... | 705/13 |

* cited by examiner

*Primary Examiner*—Tom Y Lu
(74) *Attorney, Agent, or Firm*—William H. Steinberg; Robert C. Rolnik; Cardinal Law Group

(57) ABSTRACT

A method for image tracking includes receiving a plurality of images of a first object at points along a predetermined route at least two spaced apart cameras including a first camera and a second camera, calibrating the cameras based on the received images of the first object and the predetermined route, receiving at least one image of a second object at the calibrated cameras, and determining a position of the second object based on one of the received images of the second object at the first camera. A method of image tracking includes associating at least one object with a unique identifier and receiving a plurality of images of the object moving in a field of view of at least two spaced apart cameras. The method further includes determining a position of the object based on the unique identifier and generating a position information based on the determination.

10 Claims, 7 Drawing Sheets

METHOD AND SYSTEM FOR TRACKING IMAGES

FIELD OF INVENTION

The present invention generally relates to tracking images.

BACKGROUND OF THE INVENTION

Determining the location of objects via a camera system has many advantages. Prior attempts to locate objects have required the use of two spaced-apart cameras trained at the object. Use of two views allows for depth perception.

Additionally, determining the location of particular objects can provide the foundation for additional applications. For example, a determination of the location of a particular vehicle in a large parking lot can be quite beneficial to the driver that forgets where they parked.

It is therefore a challenge to develop a method to track images to overcome these, and other, disadvantages.

SUMMARY OF THE INVENTION

One aspect of the invention provides a method for image tracking. The method includes receiving a plurality of images of a first object at points along a predetermined route at least two spaced apart cameras including a first camera and a second camera, calibrating the cameras based on the received images of the first object and the predetermined route, receiving at least one image of a second object at the calibrated cameras, and determining a position of the second object based on one of the received images of the second object at the first camera.

A second aspect of the invention provides a method of image tracking. The method includes associating at least one object with a unique identifier and receiving a plurality of images of the object moving in a field of view of at least two spaced apart cameras. The method further includes determining a position of the object based on the unique identifier and generating a position information based on the determination.

The foregoing embodiment and other embodiments, objects, and aspects as well as features and advantages of the present invention will become further apparent from the following detailed description of various embodiments of the present invention. The detailed description and drawings are merely illustrative of the present invention, rather than limiting the scope of the present invention being defined by the appended claims and equivalents thereof.

DETAILED DESCRIPTION OF THE PRESENT INVENTION

Figure 1:
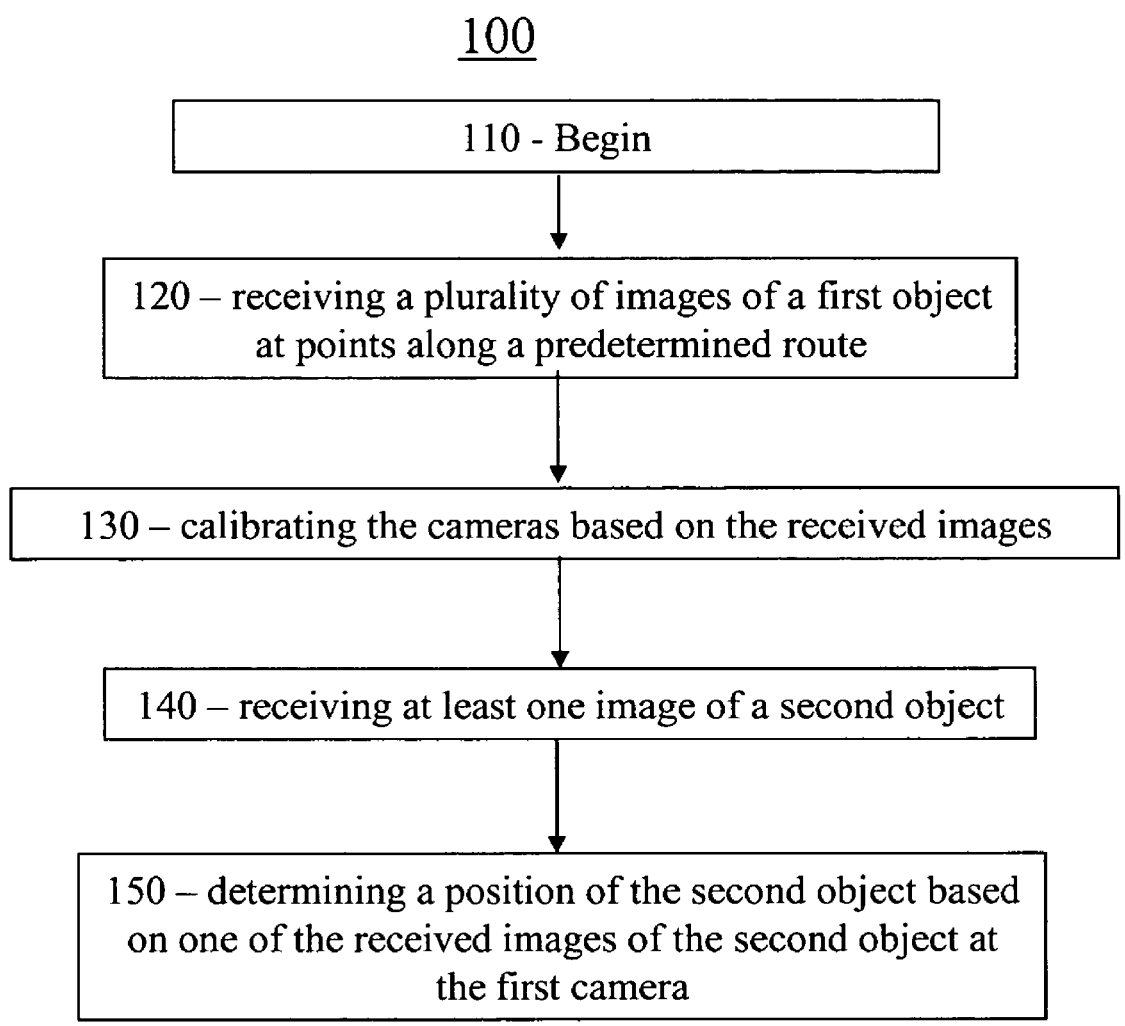
FIG. 1 illustrates one embodiment of a method for image tracking, in accordance with one aspect of the invention.

FIG. 1 illustrates one embodiment of a method 100 for image tracking, in accordance with one aspect of the invention. Method 100 begins at 110.

At step 120, at least two spaced apart cameras receive a plurality of images of a first object at points along a predetermined route. The at least two spaced apart cameras ("the cameras") include a first camera and a second camera. Each of the cameras is configured to transmit the received images to a receiver configured to perform operations on the plurality of images. For example, the cameras can be digital cameras, such as cameras including a (charge coupled device) CCD lens, connected via a wired or wireless network to a computer. In other embodiments, analog cameras, video camera, still cameras, or the like are used to implement the cameras. In one embodiment, the network operates using a gigabit Ethernet protocol. In another example, the cameras are analog cameras connected via a wired or wireless network to a computer. The computer is any computer or computers configured to perform calculations related to image processing. For example, the computer is, in one embodiment, a general-purpose computer. In other embodiments, the computer is implemented as a client-server network, or a peer-to-peer network, either dedicated or ad hoc.

The first object has predetermined, or known, characteristics including size, shape, color, and the like. In one embodiment, the shape of the object is compared to a library of shapes to determine a nature of the object, such as by comparing the shape of the object to a database including size and shape information for a plurality of cars to determine the make and mode of the object.

The predetermined route is a path through a desired area such that the position of the first object is known and can be associated with the images associated with each position. In one embodiment, the cameras are spaced apart in configuration such that each point in the vicinity of the predetermined route is within a field of view of at least two cameras and each camera has a different field of view. The field of view of a camera is the area visible through the lens of that camera. In one embodiment, the images are received at a predetermined interval, such as 30 images per second.

The first object can be a moving object or a stationary object. In embodiments where the first object is a stationary object, the first object needs to be moved along the predetermined route. In embodiments, where the first object is a moving object, the object can move along the predetermined route. In one embodiment, the first object is a test car. In another embodiment, the first object includes surveyors tools. In yet another embodiment, the first object is a human. In one embodiment, the predetermined route is a path through a parking garage. In another embodiment, the predetermined route is a path through a factory. In another embodiment, the predetermined route is a path through an access restricted facility, such as an airport or school.

The cameras are calibrated based on the received images of the first object and the predetermined route at step 130. Calibrating the cameras, in one embodiment, includes comparing the received images with the predetermined route. Based on the comparison, in one embodiment, the received images are associated with the first object.

Calibrating the cameras, in one embodiment, includes identifying a set of attributes for each pixel within the field of view of each camera. For example, a first camera includes a first field of view. Each pixel within that field of view is associated with a set of attributes during the calibration. The set of attributes includes data such as distance from camera, color, the existence of another camera associated with a field of view incorporating the pixel, vertical distance, distance between the pixel and at least one other pixel within the field of view of the camera, or other such information. As used herein, the term "pixel" refers to the smallest unit within an image that is tracked. In one embodiment, the term "pixel" includes a plurality of pixels.

The plurality of cameras receives at least one image of a second object at step 140. The second object may or may not be the same as the first object.

The computer determines a position of the second object based on one of the received images of the second object at the first camera at step 150. In one embodiment, the position determination includes comparing the image of the second object with at least one image of the first object and, based on the comparison, associating the position of the second object with the position of the first object.

In one example, the first object is a test vehicle including known characteristics. In another example, the second object is a customer vehicle. In one embodiment, the first object is a piece of luggage with known characteristics and the second object is a customer luggage.

Figure 2:
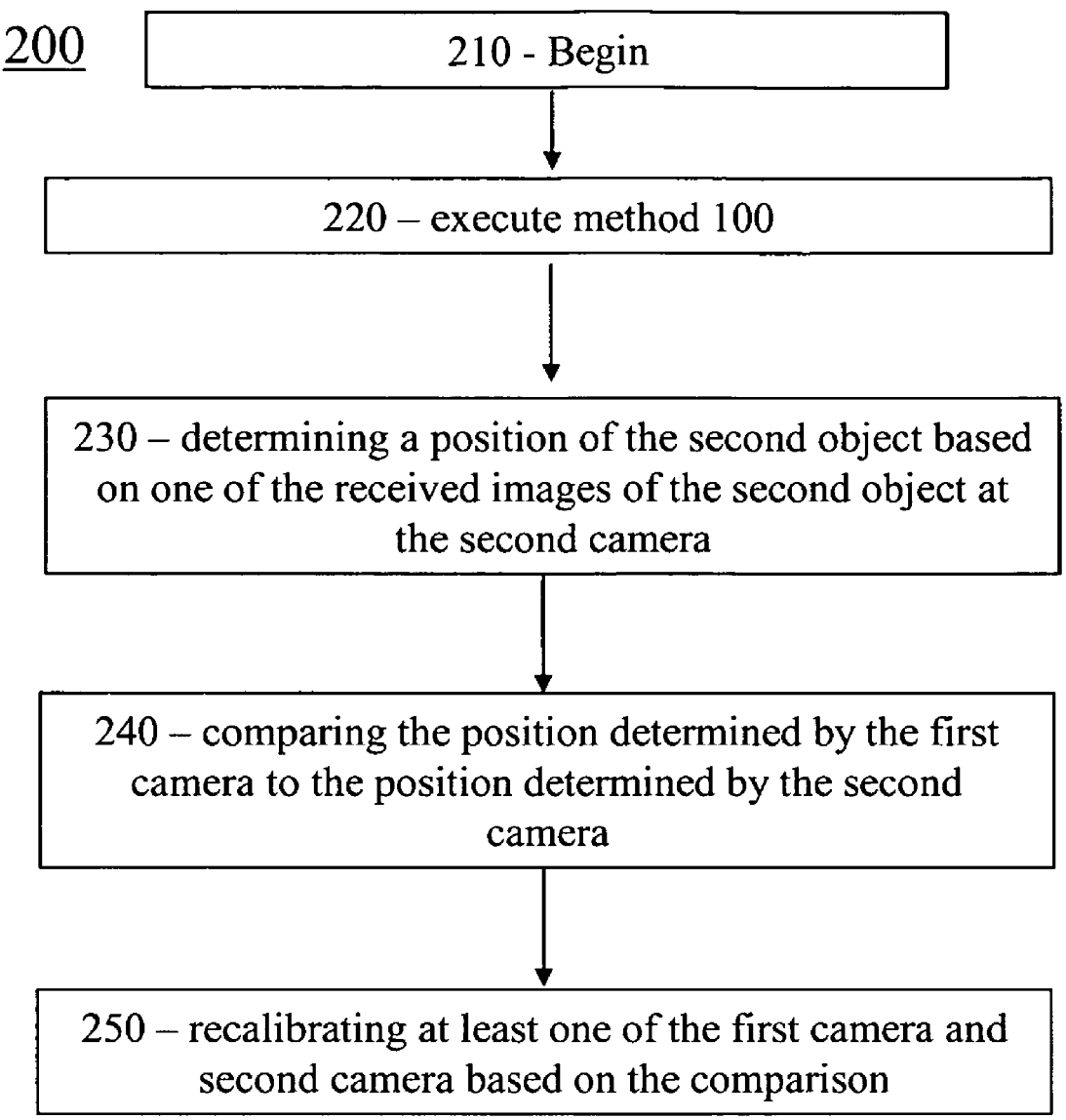
FIG. 2 illustrates one embodiment of a method for image tracking, in accordance with one aspect of the invention.

FIG. 2 illustrates another embodiment of a method 200 for image tracking in accordance with one aspect of the invention. Method 200 begins at step 210. Method 200 executes method 100 at step 220.

The computer determines a position of the second object based on one of the received images of the second object received at the second camera at step 230. Determining the position of the second object based on the images received at the second camera is implemented in similar fashion as the step 150 determination of method 100.

The computer compares the position of the second object as determined based on the images received by the first camera and the second camera at step 240. Based on the results of the comparison, the computer recalibrates at least one of the first and second cameras at step 250. In the event that the comparison of the location determined based on the first camera images is different from the location of the second object based on the second camera images, in one embodiment, the computer will determine the location of the second object using at least one additional camera to determine whether to recalibrate the first camera or the second camera, or both.

Recalibration, in one embodiment, includes electronically adjusting at least one of the cameras until the location of the second object as determined based on one image from the camera confirms the location of the second object as determined by the other camera. For example, in the event that the location is determined to be different, and the second camera is determined, based on comparisons with other cameras, to be out of calibration, the second camera is electronically adjusted until the location of the object is consistent with the location of the object as determined by a camera that remains properly calibrated.

Figure 3:
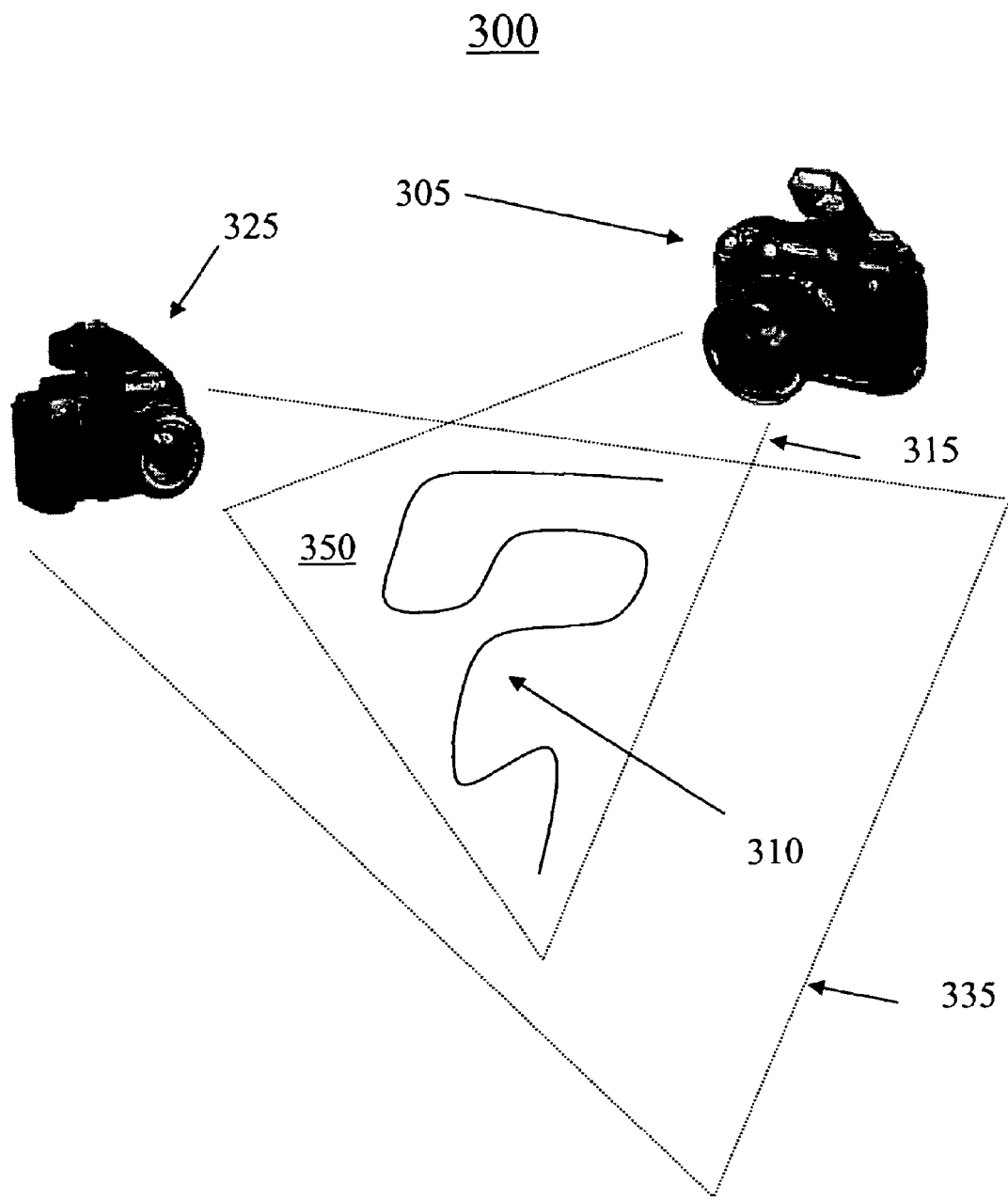
FIG. 3 illustrates a system for image tracking, in accordance with one aspect of the invention.

FIG. 3 illustrates the field of view of a first camera 305 and a second camera 325, in accordance with one aspect of the invention. Predetermined route 310 lies within the field of view 315 associated with first camera 305 and field of view 335 associated with second camera 325. Field of view 315 and field of view overlap at 350, such that each point in the vicinity of predetermined route 310 lies within the overlapping fields of view. The vicinity of a predetermined route is determined responsive to technical capacity of the implemented camera system, and is affected by the ability of the system to extrapolate from known positions to determine unknown positions. In one embodiment, the vicinity is dynamically affected based on the sample size.

Figure 4:
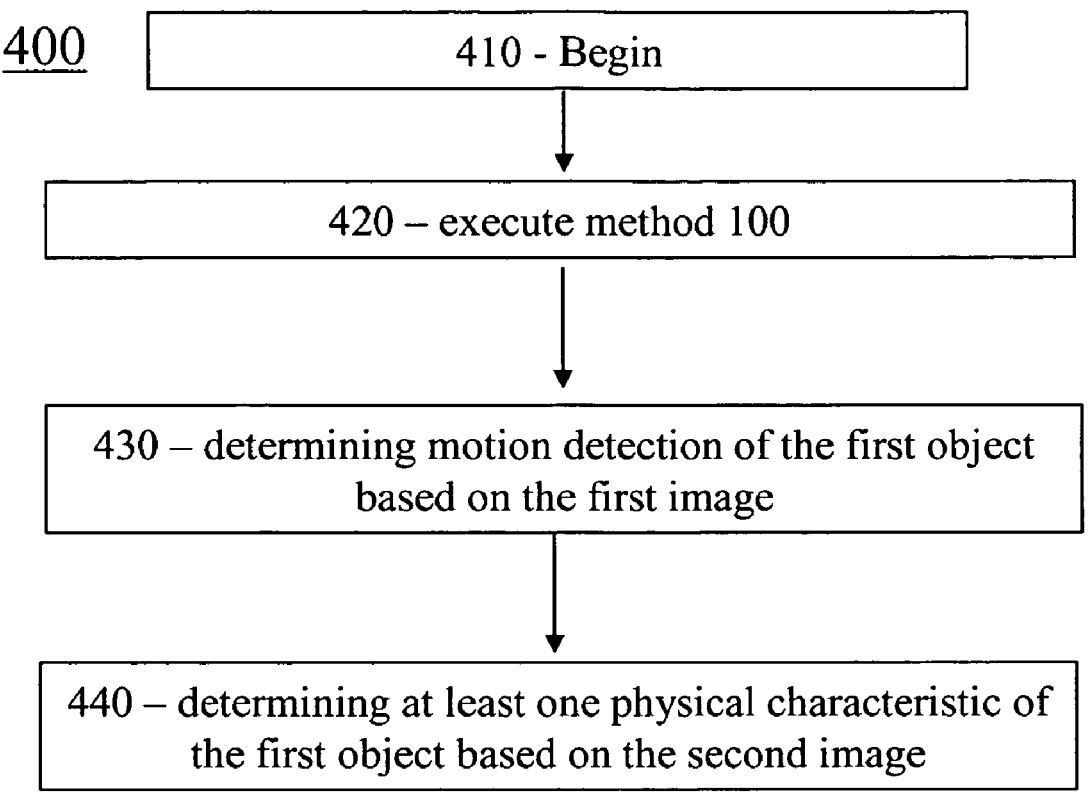
FIG. 4 illustrates a method for image tracking, in accordance with one aspect of the invention.

FIG. 4 illustrates one embodiment of another method 400 for tracking images in accordance with one aspect of the invention. During method 400, the received images include at least a first image and a second image, and the second image is taken subsequent to the first image. In one embodiment, the first and second images are sequential, such that no image of the object is taken between the first and second images. In another embodiment, the first and second images are non-sequential, such that at least one image of the object is taken between the first and second images. In one embodiment, the first image and second image are separated by four images Method 400 begins at 410. At step 420, method 400 executes method 100.

The computer determines whether the second object is moving based on the first image received at one camera at step 430. For example, the position of the second object determined based on the first image is compared to the position of the second object determined based on at least one prior image. In the event that the determined positions differ, the object is deemed to be in motion. In another embodiment physical characteristics of the object are compared to a predetermined list of motion characteristics, and the determination is responsive to this comparison. For example, objects in motion tend to assume a forward-leaning, or rearward-leaning stance responsive to acceleration or deceleration. In another example, objects in motion can assume other characteristics, such as lack of contact with a floor surface, indicative of motion. For example, if an object is not touching the floor, the object is, in certain embodiments, assumed to be in motion.

Based on the first image, method 400 determines at least one physical characteristic of the first object based on the second image. A physical characteristic is any aspect of the object capable of visual perception other than location or motion. One example of a physical characteristic is color. Another example of a physical characteristic is whether the object is emitting radiation such as light, as headlights of a vehicle, or other energy radiation such as heat.

In one embodiment, the motion detection determination is premised on a 5 frame per second standard, while characteristics of the object are determined on a 1 frame per second standard. Depending on performance demands, any number of frames can be taken per second. For example, if a particular application has a demand for high quality video images, a 30 frame per second standard can be used, with attendant requirements for processing and storage. In the event that a particular application requires less stringent quality, a 5 frame per second standard can be implemented.

Figure 5:
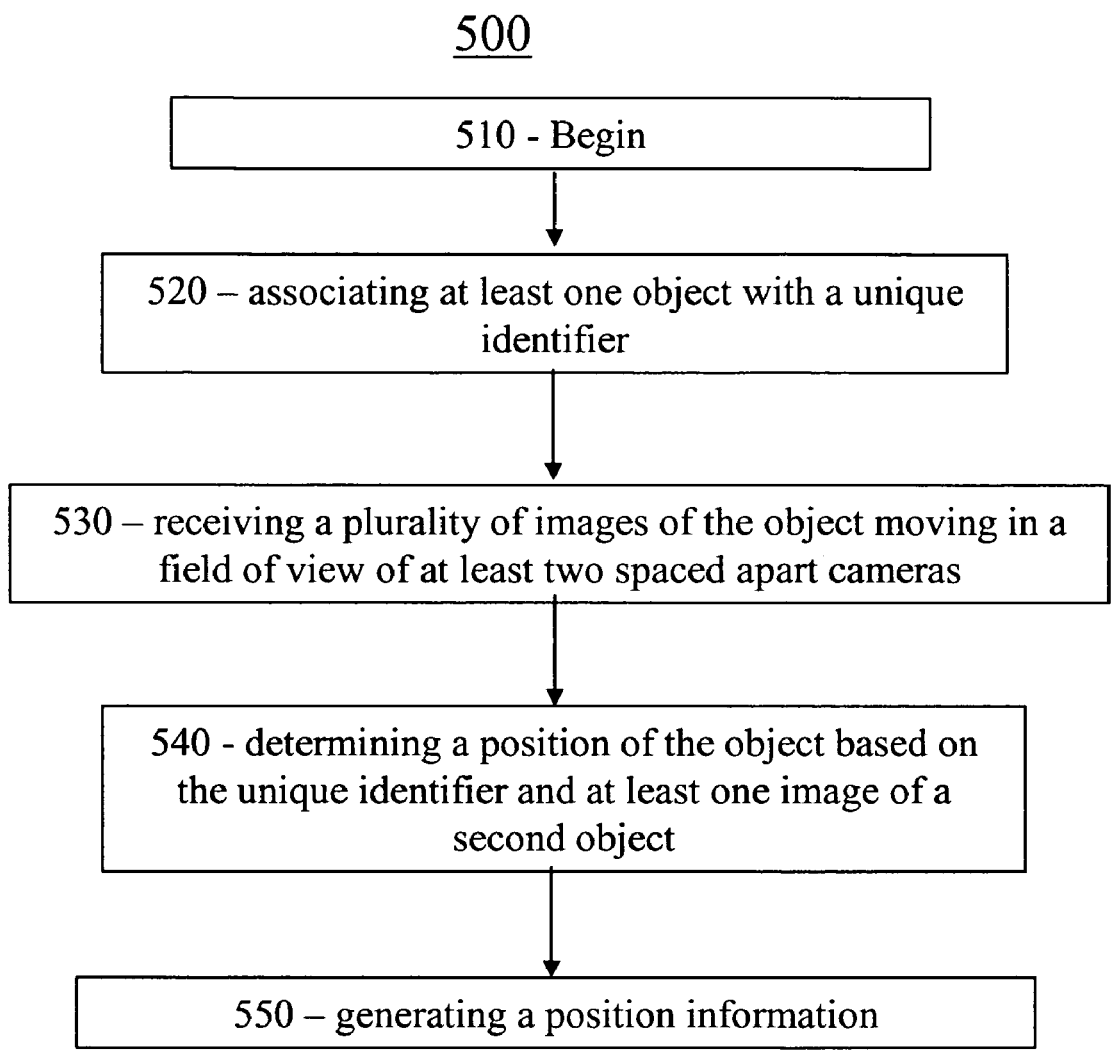
FIG. 5 illustrates a method for image tracking, in accordance with one aspect of the invention.

FIG. 5 illustrates another embodiment of a method 500 for tracking an image, in accordance with one aspect of the invention. Method 500 begins at 510.

At least one object is associated with a unique identifier at step 520. In one embodiment, the unique identifier is associated with the object based on the object entering the field of view of one camera. In another example, the unique identifier is associated with the object in response to a request for an identifier. An exemplary request for a unique identifier is requesting a parking ticket upon entry into a parking garage. Another exemplary request for a unique identifier is based on a request for a pass within an access-restricted facility. The unique identifier can be tracked entirely internal to the camera system, or can be provided to a user, such as on a ticket or displayed on a display device. In one embodiment, the device that assigns the unique identifier (such as a ticket machine) is connected to the network connecting the at least two cameras.

A plurality of images of the object moving in the field of view of at least two spaced apart cameras are received at step 530.

The position of the object is determined based on at least one of the plurality of received images, and the determined position is associated with the unique identifier at step 540. In one embodiment, the object is tracked as the object moves within an area based on the plurality of images. In one embodiment, the position is determined responsive to a single image. In another embodiment, the position is determined responsive to a first image from a first camera and a second image from a second camera, the first and second images taken at substantially the same time.

Based on the determined position, position information is generated at step 550. Position information includes any information associated with the position. For example, position information includes whether the object is moving. Position information, in another example, includes a destination for the object. In one embodiment, the position information includes a route for the object to follow to arrive at the destination. In one embodiment, the position information includes a route for the object to exit the area.

In one embodiment, a user determines the destination. In other embodiments, the destination is determined by the system, responsive to characteristics of the area within the field of view of the plurality of cameras. For example, a driver entering a corporate park requests direction to a certain building, and position information is generated in response to the request including a route to the building. In another example, a driver enters a parking garage, and position information is generated to guide the driver to an open parking spot. In another example, an airline passenger checks their baggage at a check in desk, and the position information is generated to route the checked baggage to the aircraft to transport the passenger.

Figure 6:
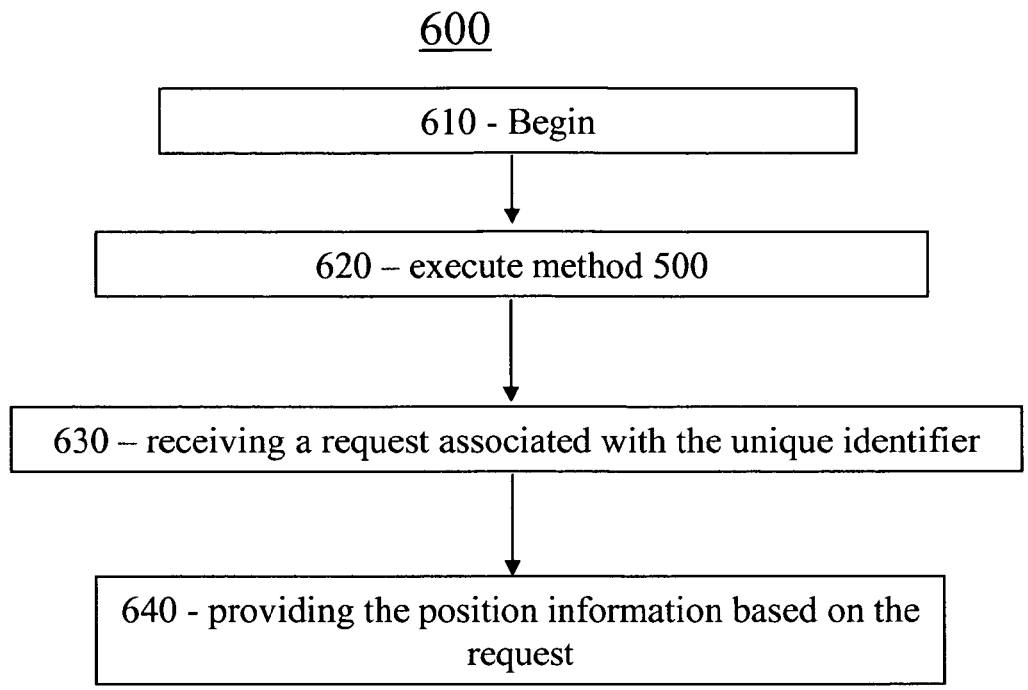
FIG. 6 illustrates a method for image tracking, in accordance with one aspect of the invention.

FIG. 6 illustrates another embodiment of a method 600 for tracking an image, in accordance with one aspect of the invention. Method 600 begins at 610. Method 600 executes method 500 at step 620.

A request associated with the unique identifier is received at step 630. For example, a ticket including the unique identifier is received by the system, such as for payment for parking. In another example, the request is generated responsive to issuance of the unique identifier. For example, a unique identifier is generated based on a car entering a parking garage, and a request is generated based on the generation of the unique identifier to identify an available parking space and generate a route to direct the car to the available parking space. In another example, the request is generated responsive to receiving the unique identifier to generate a route to exit a parking garage.

Position information is provided responsive to the request associated with the unique identifier at step 640. Position information can be presented in any appropriate fashion, such as printing, enunciating, or displaying the information.

In one embodiment, the position information is generated responsive to the request, and includes instructions for exiting the area. For example, parking lots after large events such as concerts or sporting performances are full of vehicles and emptying the parking lot can take significant time as all of the vehicles attempt to leave at once. Upon presentation of a ticket with the unique identifier, the system determines the location of the vehicle associated with the unique identifier and generates a route out of the parking lot based on the vehicle location and all routes out that the system has previously generated. The system then provides this information to the driver to reduce the traffic jam in the parking lot. In one example, the system also provides a map to where the associated vehicle is parked, either automatically or upon request.

Figure 7:
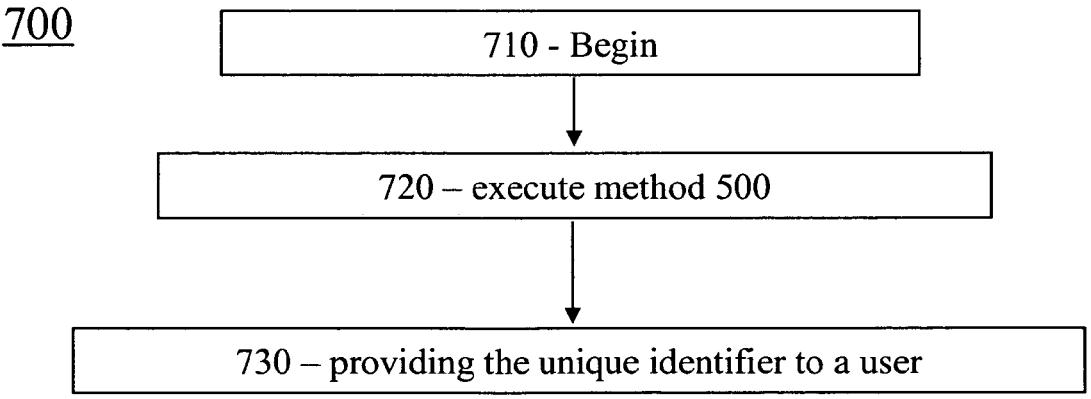
FIG. 7 illustrates a method for image tracking, in accordance with one aspect of the invention.

FIG. 7 illustrates one embodiment of a method 700 for providing a unique identifier to a user. Method 700 begins at step 710 and executes method 500 at step 720. The unique identifier is provided to a user at step 730. The unique identifier can be provided to a user in any appropriate fashion such as printing, displaying, or enunciating.

Figure 8:
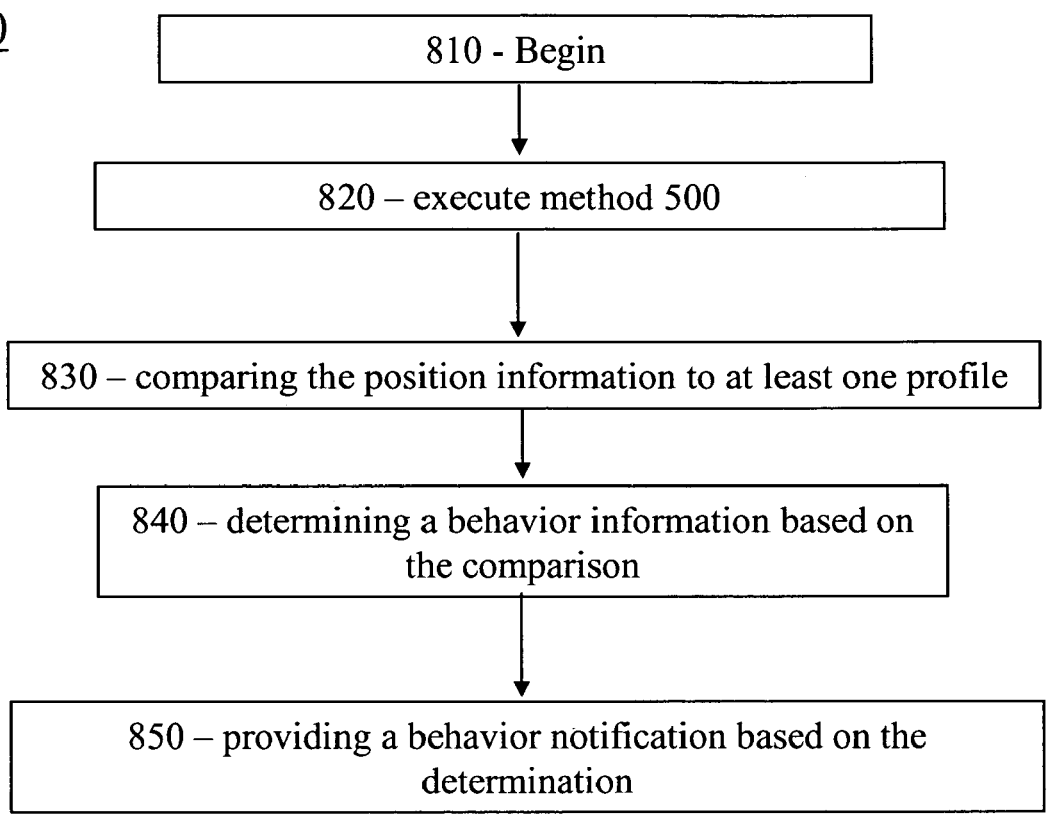
FIG. 8 illustrates an embodiment of a method for image tracking in accordance with another aspect of the invention.

FIG. 8 illustrates one embodiment of a method 800 for image tracking in accordance with one aspect of the invention. Method 800 begins at 810, and executes method 500 at step 820.

The system compares the determined position information (step 550) to at least one profile at step 830. Profiles are patterns of behavior indicative of particular actions. Profiles can be established by operation of the system as described herein, or received by the system, such as with a program. For example, a profile is associated with a vehicle driving with the vehicle lights illuminated. In another example, a profile is associated with criminal activity, such as vehicle theft In yet another example, a profile is associated with access by an unauthorized person into a secure area. In such an embodiment, the access can be determined by comparing the object to a predetermined object. In one embodiment, the profile is based on parking at an unoptimized angle, parking while occupying multiple parking spaces, vehicle lights left illuminated, failed parking lights, failed reverse lights, collisions between vehicles, or vehicles that remain parked for an abnormal length of time (such as a statistical comparison, or based on a predetermined time span).

Based on the comparison of the determined position information and profiles, a behavior information is determined. For example, if the determined position information is similar to a particular profile, the behavior of the object associated with the determined position information is associated with the profile behavior.

Behavior notification is provided by the system responsive to the determined behavior information. For example, based on a determined behavior information associated with unauthorized access, the system sounds an alarm or communicates a behavior notification to a user. The behavior notification is, for example, an alarm, email, phone call, enunciated warning, light flask or any appropriate notification.

It should be noted that both the server, camera, and devices can reside behind a firewall, or on a protected node of a private network or LAN connected to a public network such as the Internet. Alternatively, the server and devices can be on opposite sides of a firewall, or connected with a public network such as the Internet. The invention can take the form of an entirely hardware embodiment, an entirely software embodiment, or an embodiment containing both hardware and software elements. In a preferred embodiment, the invention is implemented in software, which includes but is not limited to firmware, resident software, microcode, etc. Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device), or a propagation medium such as a carrier wave. Examples of a computer-readable medium include a semiconductor or solid-state memory, magnetic tape, a removable computer diskette, a random access memory (RAM), a read-only memory (ROM), a rigid magnetic disk and an optical disk.

While the embodiments of the present invention disclosed herein are presently considered to be preferred embodiments, various changes and modifications can be made without departing from the spirit and scope of the present invention. The scope of the invention is indicated in the appended claims, and all changes that come within the meaning and range of equivalents are intended to be embraced therein.

We claim:

1. A method of image tracking, the method comprising:
   associating at least one object with a unique identifier, wherein the unique identifier is provided by a ticket machine;
   receiving at a computer the unique identifier from the ticket machine;
   receiving at two or more spaced apart cameras a plurality of images of the object moving in a field of view of the two or more spaced apart cameras;
   determining by a computer a position of the object based on the unique identifier;
   generating a position information based on the determination
   comparing the position information to at least one profile, wherein the position information is vehicle position information;
   determining a behavior information based on the comparison, wherein the behavior information is vehicle behavior information; and
   providing a behavior notification directly or indirectly to a driver based on the determination.

2. The method of claim 1 wherein the position of the object is determined based on one image.

3. The method of claim 1 wherein the position of the object is determined based on a first image from a first camera and a second image from a second camera, the first image and second image taken at substantially the same time.

4. The method of claim 1 further comprising:
   receiving a request associated with the unique identifier; and
   providing the position information based on the request.

5. The method of claim 1 further comprising:
   providing the unique identifier to a user.

6. The method of claim 1, wherein vehicle behavior information is parking in multiple parking spaces.

7. The method of claim 1, wherein comparing the position information to at least one profile comprises:
   comparing position information to a profile of parking at a non-optimal angle and a profile of parking while occupying multiple parking spaces.

8. The method of claim 1, wherein the vehicle position information is used to guide a driver to an open parking spot by generating a route to an available parking space.

9. A computer readable medium selected from the group consisting of a semiconductor memory, a solid-state memory, a magnetic tape, a removable computer diskette, a random access memory, read-only memory, a rigid magnetic disk and an optical disk including computer readable code for image tracking comprising:
   computer readable code for associating at least one object with a unique identifier, wherein the unique identifier is provided by a ticket machine;
   computer readable code for receiving the unique identifier from the ticket machine;
   computer readable code for receiving a plurality of images of the object moving in a field of view of at least two spaced apart cameras;
   computer readable code for determining a position of the object based on the unique identifier;
   computer readable code for generating a position information based on the determination;
   computer readable code for comparing the position information to at least one profile, wherein the position information is vehicle position information;
   computer readable code for determining a behavior information based on the comparison, wherein the behavior information is vehicle behavior information; and
   computer readable code for providing a behavior notification directly or indirectly to a driver based on the determination.

10. The computer readable medium of claim 9 further comprising:
    computer readable code for receiving a request associated with the unique identifier; and
    computer readable code for providing the position information based on the request.

* * * * *